US012062253B2

(12) United States Patent
Fukai

(10) Patent No.: US 12,062,253 B2
(45) Date of Patent: Aug. 13, 2024

(54) TIME MEASUREMENT SYSTEM

(71) Applicant: CONCEPT PROTO INC., Tokyo (JP)

(72) Inventor: Zenroh Fukai, Tokyo (JP)

(73) Assignee: CONCEPT PROTO INC., Tokyo (JP)

( * ) Notice: Subject to any disclaimer, the term of this patent is extended or adjusted under 35 U.S.C. 154(b) by 0 days.

(21) Appl. No.: 17/919,153

(22) PCT Filed: Apr. 15, 2021

(86) PCT No.: PCT/JP2021/015589
§ 371 (c)(1),
(2) Date: Oct. 14, 2022

(87) PCT Pub. No.: WO2021/210645
PCT Pub. Date: Oct. 21, 2021

(65) Prior Publication Data

US 2023/0128618 A1 Apr. 27, 2023

(30) Foreign Application Priority Data

Apr. 15, 2020 (JP) ................................ 2020-072880

(51) Int. Cl.
*G07C 1/24* (2006.01)
*G04F 13/02* (2006.01)

(52) U.S. Cl.
CPC ............... *G07C 1/24* (2013.01); *G04F 13/02* (2013.01)

(58) Field of Classification Search
None
See application file for complete search history.

(56) References Cited

U.S. PATENT DOCUMENTS 9,883,332 B2 * 1/2018 Hansen .................. G16H 40/63
2018/0326285 A1 11/2018 Petersen et al.

FOREIGN PATENT DOCUMENTS

JP 2005-283337 A 10/2005
JP 2006-158713 A 6/2006
JP 2006-268660 A 10/2006
JP 2008-299535 A 12/2008
JP 2011-085475 A 4/2011
JP 2015-014884 A 1/2015
JP 2017-156267 A 9/2017
(Continued)

OTHER PUBLICATIONS

International Search Report and Written Opinion of the International Searching Authority directed to related International Patent Application No. PCT/JP2021/015589, mailed Jul. 6, 2021; 9 pages.
(Continued)

*Primary Examiner* — Cassandra F Cox
(74) *Attorney, Agent, or Firm* — Sterne, Kessler, Goldstein & Fox P.L.L.C.

(57) ABSTRACT

A time measurement system includes a first sensor and a second sensor, each of which has a communication function, and an electronic device terminal carried by a measurement target person. The electronic device terminal carried by the measurement target person acquires sensor signals output by the first sensor and the second sensor arranged in a time measurement section and transmits the acquired sensor signals to a data server on the Internet. The data server performs arithmetic processing on the time information.

14 Claims, 3 Drawing Sheets

(56) References Cited

FOREIGN PATENT DOCUMENTS

| | | | |
|---|---|---|---|
| JP | 6550612 | B1 | 7/2019 |
| JP | 2019-132752 | A | 8/2019 |
| WO | WO2019/103156 | A | 5/2019 |
| WO | WO 2019167955 | | 9/2019 |

OTHER PUBLICATIONS

Supplemental European Search Report directed to European U.S. Appl. No. 21/788,857, mailed Apr. 2, 2024; 2 pages.

* cited by examiner

FIGURE 5

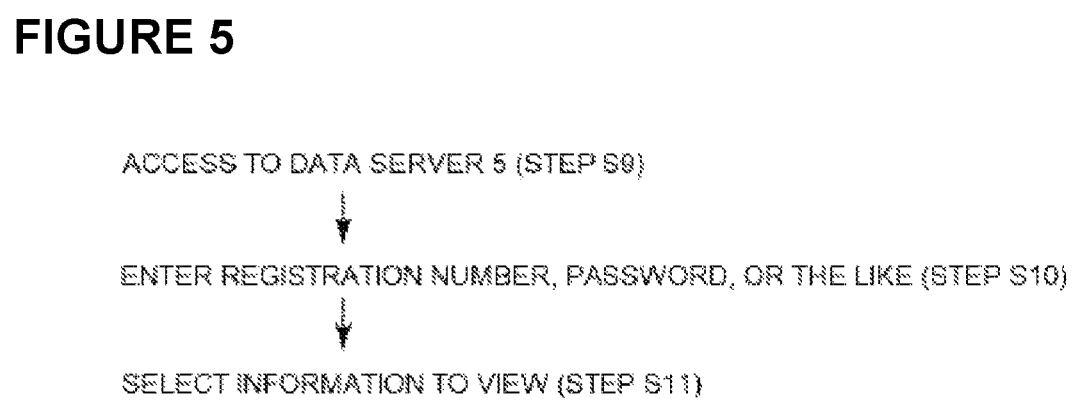

ACCESS TO DATA SERVER 5 (STEP S9)

↓

ENTER REGISTRATION NUMBER, PASSWORD, OR THE LIKE (STEP S10)

↓

SELECT INFORMATION TO VIEW (STEP S11)

TIME MEASUREMENT SYSTEM

TECHNICAL FIELD

One aspect of the present invention relates to a time measurement system that measures time taken to travel a certain section.

BACKGROUND ART

Typically, time measurement devices, such as a stopwatch, are used to accurately measure the time taken to travel a certain section. In recent years, there has been a demand for eliminating errors in measurement caused by a measuring person and performing an accurate measurement even up to one hundredth of a second. In response to this demand, a time measurement system using electric signals and a time measurement system using a clock with a small time measurement error have been provided.

As an example of such time measurement systems, there is provided a configuration in which time measurement apparatuses each having a communication function and equipped with a sensor unit composed of a photoelectric sensor are used as a set. First, the time measurement apparatuses that have been synchronized with each other are arranged at respective locations where the measurement is started and where the measurement is finished. By connecting these time measurement apparatuses by wireless communication or wired communication, passage times or a travel time of a measurement target person are measured based on detection signals from the respective sensor units (for example, Patent Document 1).

CITATION LIST

Patent Document

Patent Document 1: Japanese Patent No. 6550612

SUMMARY

Technical Problem

However, the time measurement system described in Patent Document has a problem in that each sensor needs to have equipment capable of performing network communication, which increases the cost. In addition, there is a problem in that the size and weight of the sensor itself are also increased.

Solution to Problem

To solve the above problems, a time measurement system according to claim 1 of the present invention includes: a first sensor which includes a first time acquisition unit that acquires first time information at first timing and a first transmission unit that transmits the first time information; a second sensor which includes a second time acquisition unit that acquires second time information at second timing and a second transmission unit that transmits the second time information; and an electronic device terminal which is carried by a measurement target person and includes a first receiving unit that receives the first time information transmitted from the first sensor and the second time information transmitted from the second sensor.

According to claim 1 of the present invention, since the sensor itself does not need to have equipment for network communication, an increase in cost can be reduced. In addition, since the size of each sensor can be made compact and the weight thereof can be reduced, there is an advantage that the sensor can be carried and used.

In the time measurement system according to claim 2 of the present invention, the electronic device terminal includes a third transmission unit that transmits information received by the first receiving unit by network communication.

In the time measurement system according to claim 3 of the present invention, the time measurement system according to claim 2 includes a data server that includes a second receiving unit that receives information transmitted from at least the third transmission unit of the electronic device terminal and a storage unit that stores information received by the second receiving unit.

In the time measurement system according to claim 4 of the present invention, the electronic device terminal of the time measurement system according to claim 1, 2, or 3 includes a calculation unit that calculates a difference between the received first time information and the received second time information.

In the time measurement system according to claim 5 of the present invention, the data server of the time measurement system according to claim 3 includes a calculation unit that calculates a difference between the received first time information and the received second time information.

A method of time measurement according to claim 6 of the present invention includes the steps of: causing a measurement target person to carry an electronic device terminal; acquiring first time information when the measurement target person passes a first sensor; transmitting the acquired first time information to the electronic device terminal; acquiring second time information when the measurement target person passes a second sensor; and transmitting the acquired second time information to the electronic device terminal.

In the method of time measurement according to claim 7 of the present invention, the method of the time measurement according to claim 6 includes the step of transmitting the first time information and the second time information acquired by the electronic device terminal to a data server.

In the method of the time measurement according to claim 8 of the present invention, the method of the time measurement according to claim 7 includes the step of storing the first time information and the second time information in the data server.

In the method of the time measurement according to claim 9 of the present invention, the method of the time measurement according to any one of claims 6 to 8 includes the step of calculating a difference between the first time information and the second time information in the electronic device terminal.

In the method of the time measurement according to claim 10 of the present invention, the method of the time measurement according to claim 7 includes the step of calculating a difference between the first time information and the second time information in the data server.

BRIEF DESCRIPTION OF DRAWINGS

FIG. 5 is a flowchart illustrating a process of viewing a measurement result in the time measurement system in FIG. 1.

Hereinafter, an embodiment of the present invention will be described in detail with reference to the drawings.

Figure 1:
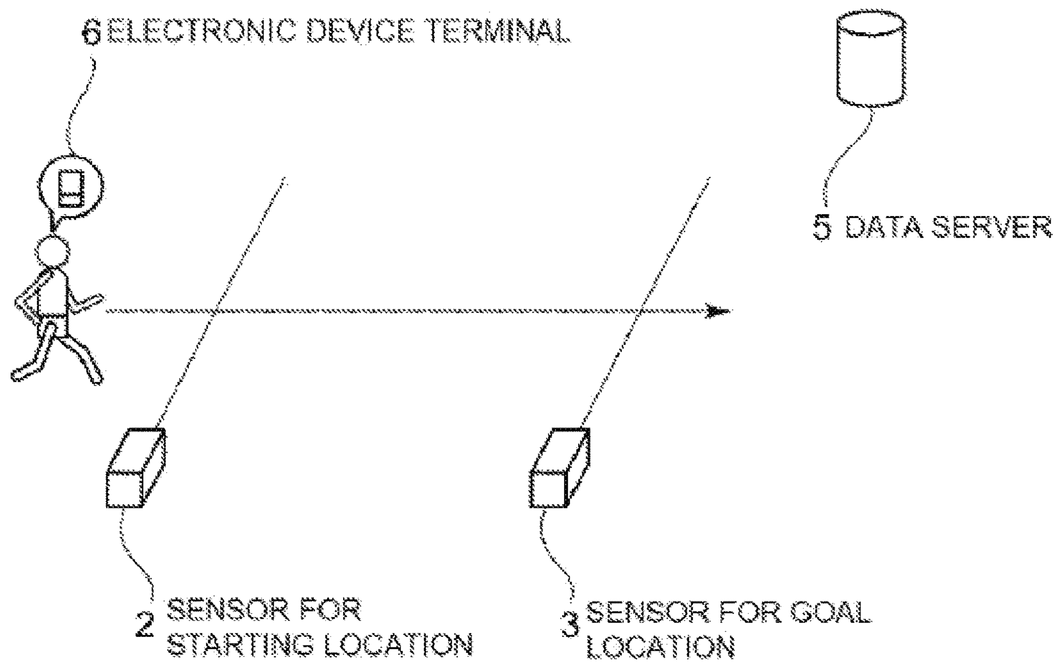
FIG. 1 illustrates a schematic configuration of a time measurement system according to an embodiment of the present invention.

FIG. 1 illustrates a conceptual configuration of a time measurement system according to an aspect of the present invention. This time measurement system 1 measures the time taken by a measurement target person 6 to travel or pass through a predetermined section.

The time measurement system 1 includes an electronic device terminal (for example, a smartphone) that is carried by and travels with the measurement target person 6.

Although not illustrated, this electronic device terminal includes a communication unit (third communication unit) that performs GPS (Global Positioning System) communication and network communication, for example, Internet communication.

In the present embodiment, while the Internet communication is used as an example of the network communication, the network communication is not limited thereto. Other network communication is applicable as long as a component corresponding to a data server can be installed. This electronic device terminal transmits time information acquired using the Internet communication to a data server 5, which will be described later.

The time measurement system 1 also includes a first sensor 2 (start sensor) and a second sensor 3 (goal sensor).

The first sensor 2 for a starting location includes a starting location passage sensor 11, a starting location timer 12, (the starting location passage sensor 11 and the starting location timer 12 are collectively referred to as a first time acquisition unit), a memory 34, and a communication unit (first transmission unit) capable of short-range communication.

It is desirable that the starting location passage sensor 11 and the starting location timer 12 be integrally configured. However, the starting location passage sensor 11 and the starting location timer 12 may be separately provided.

The starting location passage sensor 11 is placed at a starting location where the time measurement is started.

A known sensor can be used as the starting location passage sensor 11. For example, in a case of a non-contact sensor, a photoelectric sensor or a magnetic sensor is desirable. As the photoelectric sensor, a known sensor including a light projecting unit that emits infrared light or laser light and a light receiving unit can be used. When a measurement target person passes transversely across the emitted infrared light or laser light, the light receiving unit detects light interception or reflected light, thereby outputting a sensor signal.

Alternatively, a sensor in which a gate (in a form of a bar or door) that opens and closes and an electric switch are combined can also be used. In this configuration, the gate is placed at a starting location, and when the gate is opened, for example, when a measurement target person 6 pushes and opens the gate, the electric switch is turned on, and the time measurement is started. Further, in a case of a system in which the measurement is electrically started, a device that emits light or sound is placed at the starting location instead of the sensor, and when the device notifies the start of the measurement by emitting light or sound, an electric signal for starting the time measurement may be output by the device.

At first timing when a sensor signal is output from the starting location passage sensor 11, the starting location timer 12 acquires and stores time information about the start of the measurement. The first transmission unit capable of short-range communication transmits the acquired time information as first time information to an electronic device terminal that is carried by and travels with the measurement target person 6.

The second sensor 3 for a goal location includes a goal location passage sensor 13, a goal location timer 14 (the starting location passage sensor 13 and the starting location timer 14 are collectively referred to as a second time acquisition unit), a memory 34, and a communication unit (second transmission unit) capable of short-range communication.

It is desirable that the goal location passage sensor 13 and the goal location timer 14 be integrally configured. However, the goal location passage sensor 13 and the goal location timer 14 may be separately provided. The goal location passage sensor 13 is placed at a goal location where the time measurement is finished. A known sensor can be used as the goal location passage sensor 13, as with the starting location passage sensor.

At second timing when a sensor signal is output from the goal location passage sensor 13, the goal location timer 14 acquires and stores time information about the end of the measurement. The second transmission unit capable of short-range communication transmits the acquired time information as second time information to the electronic device terminal that is carried by and travels with the measurement target person 6.

In addition, if it is assumed that the measurement target person 6 passes in proximity, a non-contact sensor is suitable for the goal location passage sensor 13, and for example, a photoelectric sensor or a magnetic sensor is used.

The time measurement system 1 further includes a data server 5 connected to the Internet 4.

A third transmission unit performing Internet communication of the electronic device terminal that is carried by and travels with the measurement target person 6 transmits the first time information and the second time information acquired from the first sensor 2 and the second sensor 3, respectively, to the data server 5.

The starting location timer 12 and the goal location timer 14 described above can use commercial frequency alternating current (AC) voltage or rectified direct current (DC) voltage as a power source (not illustrated).

In addition, since the use under an environment where there is no power supply such as outdoors is assumed, a battery, for example, a dry battery such as an alkaline battery or a rechargeable battery such as a lithium battery can be attached and used.

Further, the exterior or housing of each of the starting location timer 12 and the goal location timer 14 may be equipped with a solar panel that serves as an auxiliary power source. This auxiliary power source may function to extend battery life or assist the battery in a case where the output voltage of the battery is reduced in the use under a low-temperature environment. Further, an input terminal for an external power supply may be additionally provided so that power can be supplied from an external DC or AC power supply.

The exterior member or the housing of the starting location timer 12 and the goal location timer 14 has a structure having a strength and a function capable of withstanding an impact from the outside such as a fall and protecting the interior components.

The exterior member or the housing is formed of, for example, a hard resin member or metal material. The exterior member or the housing is provided with a handle or a shoulder strap fitting so as to be easily carried. Further, the exterior member or the housing may be provided with a detachable leg portion or a connector to be attached to another device.

The starting location timer 12 and the goal location timer 14 further include a waterproof function, a dust-proof function, and a dew condensation prevention function. As the waterproof function, a waterproof packing is attached between a component exposed to the outside, for example, an antenna part and the housing or to a joint portion of the housing. Further, depending on an ambient environment where the device is used, a cooling mechanism for adjusting an increase in temperature inside the housing or a heat-retaining mechanism for adjusting a decrease in temperature inside the housing or for preventing dew condensation inside the housing may be provided as appropriate. As the cooling mechanism, for example, in a case of air cooling, a cooling fin for propagating internal temperature may be attached to be exposed to the outside. In a case of water cooling, a pipe or the like having high thermal conductivity in which a refrigerant is sealed may be arranged inside the housing, and the refrigerant may be circulated by a small pump or the like while being cooled by the cooling fin. As the heat-retaining mechanism, a heat insulating material may be attached to the inner surface of the housing, or a heater unit using a resistance heater or a Peltier element may be provided. These mechanisms may be appropriately selected and mounted in accordance with the environment in which the device is used. In this way, by making temperature adjustments to the starting location timer 12 and the goal location timer 14, the usable time of the mounted battery can be secured, and malfunction of the circuit components and deterioration of accuracy can be prevented.

The data server 5 in one aspect is a so-called web data server, and for example, a computer and a large-capacity memory that are capable of performing arithmetic processing and storing information can be used as the data server 5. The data server 5 performs arithmetic processing for obtaining a difference between the received time information about the time at which the measurement is started and time information about the time at which the measurement is finished and stores the calculation result in a memory (not illustrated) provided in the data server 5 as time information.

The data server 5 stores some applications that implement various forms of browsing. These applications are used, for example, to numerically display ranking, maximum and minimum time information, and average time information for time information relating to selected identification information among all time information in one file, for all stored time information, or for specific time information. Further, the output can be provided in various browsing forms such as deviation values or a distribution graph of all time information. In addition, the output can also be displayed in a browsing form such as a comparison with time information stored in the past (personal best) for each measurement target person.

The time information stored in the data server 5 is read into a communication terminal, for example, a personal computer 24 or a wireless mobile terminal 7 such as a smartphone through the Internet 4 to be viewed.

First, the data server 5 is accessed from the wireless mobile terminal 7 or the personal computer 24 through the Internet 4.

The wireless mobile terminal 7 is connected to the Internet 4 under an environment of 4G or 3G of a base station 22 or under an environment of Wi-Fi using a wireless LAN router 23 or the like. The personal computer 24 or the like is connected to the Internet 4 under an environment using a modem, a router, or the like that provides a wired connection to the Internet 4 or under a Wi-Fi environment described above.

Here, by entering a registration number or a password set in the data server 5 in advance, only a viewer whose access is permitted can view the time information. Note that the permitted viewer is a person who knows the registration number or the password. Of course, if the time information is made publicly available, the time information may be set to be accessible by anyone without any limitation.

Next, the viewer who has accessed the data server 5 searches a plurality of items of stored time information for desired time information by using the identification information to read out and display the read time information on a display screen of the personal computer 24 or the wireless mobile terminal 7.

In the above-described operations of the time measurement system according to the present embodiment, the first sensor 2 for the starting location and the second sensor 3 for the goal location have no direct communication to each other.

Therefore, even when an obstacle causing a communication failure exists between the installation locations of the first sensor 2 for the starting location and the second sensor 3 for the goal location, the time measurement and the communication are unaffected.

Thus, the time measurement system can perform communication without a problem even when obstacles such as a high building in a city and a mountain peak exist between the starting location and the finishing location.

Since the time measurement system of the present embodiment allows a competitor to check the time information by a communication terminal using Internet communication, the competitor does not need to return to the location where the measurement is finished. Further, with the time measurement system of the present embodiment, the time information to be the time measurement result can be viewed through the Internet 4. Thus, the competitor can access the data server 5 by using a mobile terminal or a personal computer from a location far away from the installation locations of the first sensor 2 for the starting location and the second sensor 3 for the goal location so that the time information can be easily obtained.

In addition, since the arithmetic processing on the time information and the processing for displaying the time information are performed by the data server 5, it is easy to update to the latest processing program and application. Further, the starting location timer 12 and the goal location timer 14 can be managed by mounting small-capacity memories so that the manufacturing cost can be reduced.

EMBODIMENT

Next, a time measurement system according to Embodiment 1 will be described with reference to FIGS. 2 and 3.

Figure 2:
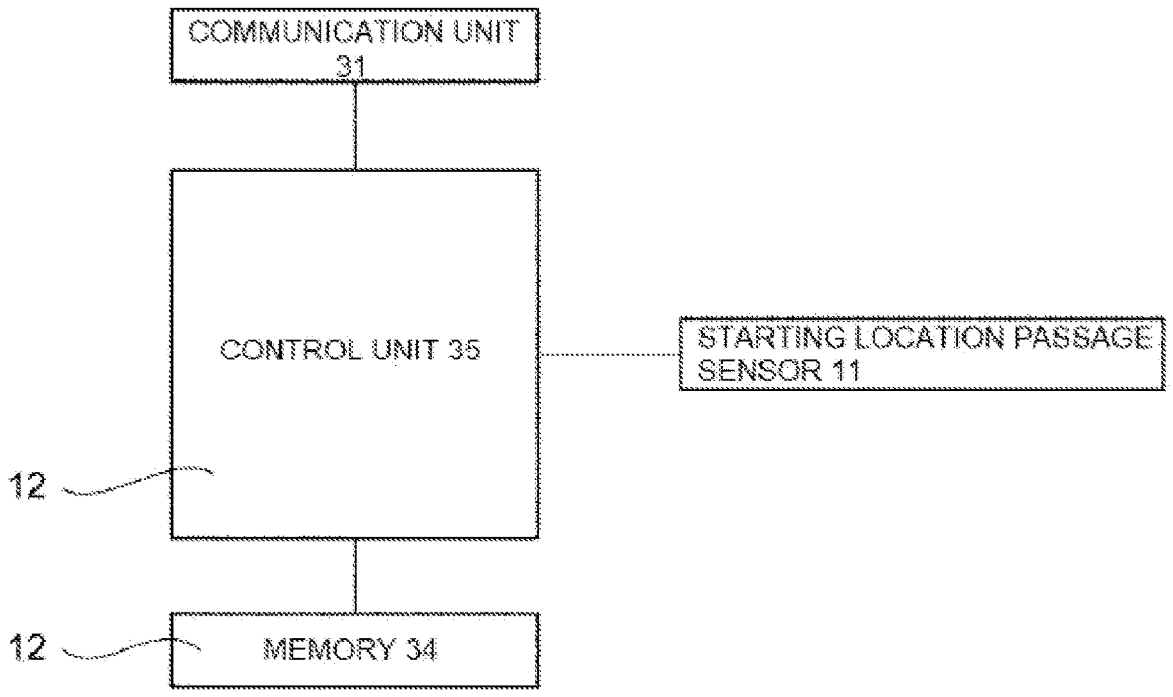
FIG. 2 is a block diagram illustrating a configuration example of a sensor 2 for a starting location in FIG. 1.

FIG. 2 is a block diagram illustrating a configuration of a first sensor 2 for a starting location.

The first sensor 2 for the starting location includes a starting location passage sensor 11, a starting location timer 12, and a communication unit 31 that performs short-range communication.

The starting location timer 12 is provided with a memory 34 that stores information such as setting items, a control unit 35 that controls the entire measuring instrument, and a power switch (not illustrated).

The communication unit 31 (first transmission unit) that performs short-range communication transmits acquired first time information to an electronic device terminal that is carried by and travels with a measurement target person 6. The communication unit 31 can be realized by a known configuration.

The memory 34 is a is an auxiliary storage element. A semiconductor storage element such as a ROM or a RAM is used as the memory 34. The memory 34 stores a control program and application software executed by the control unit 35, which will be described below, to perform control operations and processing.

The control unit 35 is a device for performing arithmetic processing. For example, a CPU having a register for temporarily storing data, an interface, and the like can be used as the control unit 35. The control unit 35 usually includes an oscillation circuit that oscillates a system clock (hereinafter, referred to as a clock) needed for controlling each component while adjusting operation timing. In the present embodiment, a clock unit is configured using clock signals of the oscillation circuit. Of course, in the clock unit, a dedicated clock unit may be separately provided without using the control unit 35.

Next, a sensor 3 for a goal location will be described.

Figure 3:
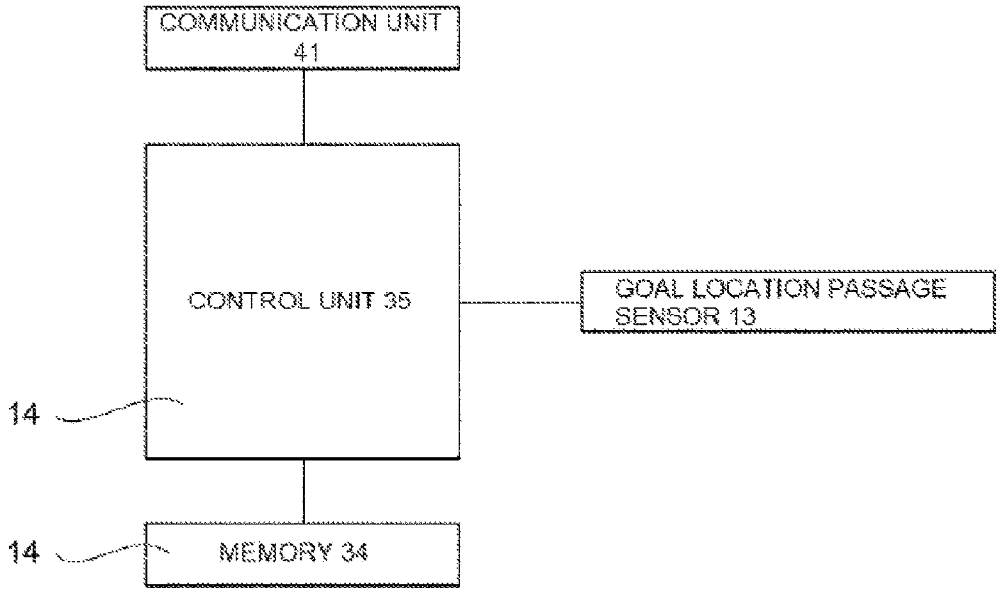
FIG. 3 is a block diagram illustrating a configuration example of a sensor 3 for a goal location in FIG. 1.

FIG. 3 is a block diagram illustrating a configuration of the sensor 3 for the goal location.

This sensor 3 for the goal location includes a goal location passage sensor 13 and a communication unit 41 that performs short-range communication with a goal location timer 14.

The goal location timer 14 is provided with a memory 34 that stores such as setting items, a control unit 35 that controls the entire measuring instrument, and a power switch (not illustrated).

The communication unit 41 (second transmission unit) that performs short-range communication transmits acquired second time information to the electronic device terminal that is carried by and travels with the measurement target person 6. The communication unit 41 can be realized by a known configuration.

Since the memory 34 and the control unit 35 are similar to those used in the sensor 2 for the starting location, descriptions thereof are omitted.

An example in which the time measurement system according to Embodiment 1 described above is applied to a skiing or snowboarding competition on snow will be described. This skiing or snowboarding competition competes the time taken to run a course while passing a plurality of flag gates arranged on the snow.

First, a measurement target person (competitor) downloads measurement application software to an electronic device terminal (smartphone) that the measurement target person carries during a competition and activates the application software. By downloading this application, the time measurement system (acquisition of the first and second time information and transmission thereof to a data server 5) becomes available.

In a preset race course, the first sensor 2 for the starting location is placed near a starting location of a run on a mountain top side, and the second sensor 3 for the goal location is placed near a finishing location of the run on a mountain foot side.

In this embodiment, the starting location passage sensor 11 of the first sensor 2 for the starting location is integrally configured with the starting location timer 12.

The starting location passage sensor 11 acquires a time at which the competitor passes the starting location passage sensor 11 as a start time of a run. In the present embodiment, a pair of photoelectric sensors described above is used as the starting location passage sensor 11.

The goal location passage sensor 13 of the second sensor 3 for the goal location is also integrally configured with the goal location timer 14.

A pair of photoelectric sensors is used as the goal location passage sensor 13 and is placed at a goal location. A time at which the competitor passes the goal location passage sensor 13 is stored and used as a finish time of the run.

A process of acquiring a start time of a run and a finish time of the run using the first sensor 2 for the starting location and the second sensor 3 for the goal location will be described with reference to FIGS. 1, 2, and 3 and a flowchart illustrated in FIG. 4.

Figure 4:
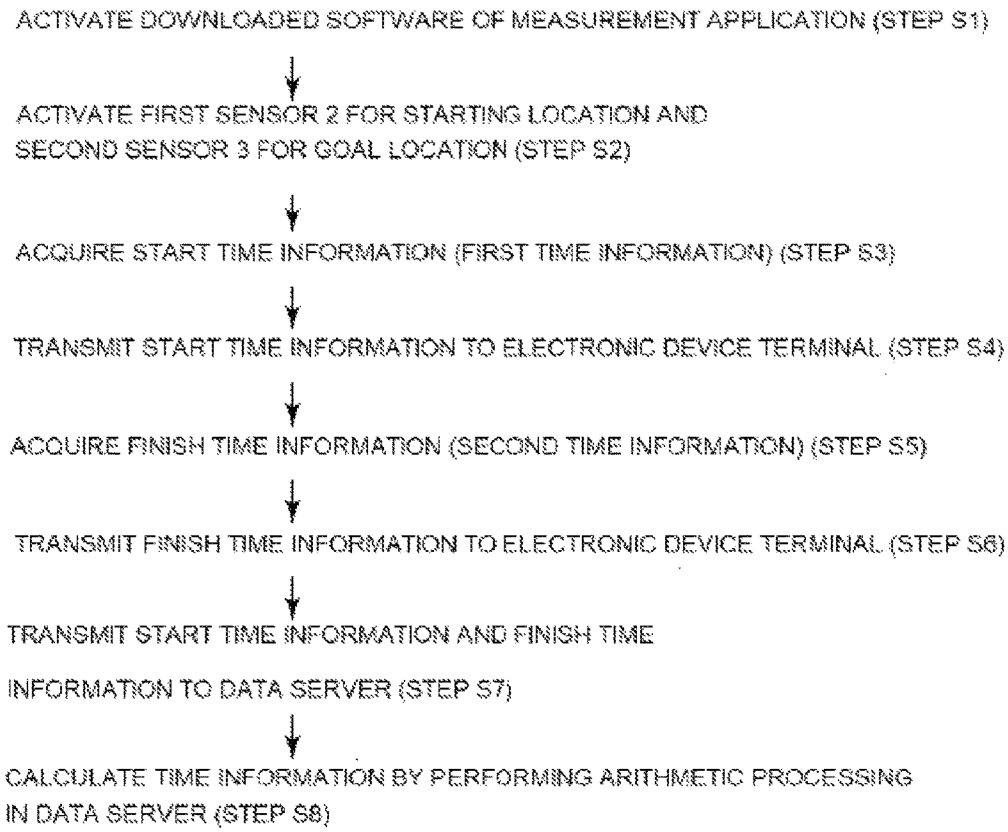
FIG. 4 is a flowchart for describing a time measurement by the time measurement system in FIG. 1.

FIG. 4 is a flowchart illustrating a time measurement by the time measurement system.

First, a measurement target person (competitor) downloads measurement application software to an electronic device terminal (a smartphone, a tablet, or the like) that the measurement target person carries during a competition and activates the application software (step S1).

Next, the first sensor 2 for the starting location and the second sensor 3 for the goal location are activated. It is desirable to perform an operation check to see if the sensors are securely activated (step S2).

Next, when the competitor starts a run and passes the starting location passage sensor 11, the starting location passage sensor 11 supplies a sensor signal to the starting location timer 12. When the sensor signal is received, the control unit 35 of the starting location timer 12 acquires start time information (first time information) (step S3).

The communication unit 31 of the first sensor 2 for the starting location transmits the acquired start time information to the electronic device terminal carried by the competitor (step S4).

Next, when the competitor passes the goal, the goal location passage sensor 13 supplies a sensor signal to the goal location timer 14. When the sensor signal is received, the control unit 35 of the goal location timer 14 acquires finish time information (second time information) (step S5).

The communication unit 41 of the second sensor 3 for the goal location transmits the acquired finish time information to the electronic device terminal carried by the competitor (step S6).

Here, the starting location timer 12, the goal location timer 14, and the electronic device terminal carried by the competitor are connected by short-range wireless communication such as Bluetooth (registered trademark).

Next, the third transmission unit of the electronic device terminal carried by the competitor transmits the acquired start time information and finish time information to the data server 5 (step S7).

The data server 5 temporarily stores time information transmitted from a specific electronic apparatus terminal as a set.

An arithmetic processing unit (not illustrated) in the data server 5 calculates the time taken for the run by subtracting the start time information from the finish time information as run time information (difference) (step S8).

e.g. Start time information: 10:10:13.634

Finish time information: 10:11:52.102

Run time information: 1 minute 38.468 seconds

Next, viewing of the run time information stored in the data server 5 will be described with reference to above-described FIG. 1 and a flowchart illustrated in FIG. 5.

FIG. 5 is a flowchart illustrating a process of viewing a measurement result using a terminal in the time measurement system. Here, an example in which the competitor (viewer) views a measurement result after finishing the run.

First, the viewer accesses the data server 5 from his or her terminal, for example, an electronic device terminal such as a personal computer or a smartphone through the Internet 4 (step S9).

A wireless mobile terminal is connected to the Internet 4 under an environment of 4G or 3G of a base station or under an environment of Wi-Fi using a wireless LAN router or the like. Alternatively, a connection to the Internet 4 may be established under an environment using a router or the like that provides a wired connection to the Internet 4.

The data server 5 requests a registration number or a password from the personal computer or electronic device terminal that has accessed the data server 5. In this example, only a viewer who is permitted to access the data server 5 by entering a preset registration number or password can view the time information.

However, if the time information is made publicly available, the time information may be set to be accessible to anyone without limitation.

When the electronic device terminal that has transmitted the time information to the data server 5 accesses the data server 5 using the downloaded application software, the registration number or the password may not be requested. In this case, viewing is permitted based on the information about the electronic device terminal.

When the viewer enters the registration number or the password (step S10), the data server 5 displays, for example, an index (subjects for viewing) of the time information that corresponds to the registration number (step S11).

For ease of selection, as the subjects for viewing, for example, items such as a date and time at which the time information is stored, a location (for example, a ski resort name), and a name of the host or ski club, or online ranking of run times are displayed.

The viewer enters the competitor's name on the screen of a selected viewing subject to read out the desired time information to be displayed on the display screen of the personal computer 24 or the wireless mobile terminal 7.

It is possible not only to view the time information from runtime records stored in the past but also to view a current status of time information being sequentially updated as each of a plurality of competitors has a run. In the case of the time information being updated, the viewer can view an up-to-the-minute update of the time information.

In addition to ranking, data such as a time difference from the leading person, an average speed (if the race distance is known), a deviation value, and distribution may also be displayed. Further, by reading out the data stored in the past, the viewer can view the data by comparison with the past data.

As described above, according to Embodiment 1, the own run time (time information), the ranking, and run times (time information) of the other competitors can be obtained by the simple time measurement system.

In a case where the finish time information cannot be acquired for some reason, the time information at the time of goal can be acquired from the communication unit 41 of the goal location timer 14 by bringing the electronic device terminal carried by the competitor close to the goal location timer 14 after the goal.

Next, the finish time information is also transmitted to the data server 5 by using the third transmission unit of the electronic device terminal that performs Internet communication.

When the electronic device terminal carried by the competitor acquires the time information at the time of start, the electronic device terminal may not transmit the start time information (first time information) to the data server 5 right away but may transmit, to the data server 5, the start time information together with finish time information (second time information) at the time of acquisition of the finish time information.

The time measurement system according to one aspect described above can be applied to not only the above-described competition on snow but also various kinds of time measurement. For example, the time measurement system can perform time measurement for various kinds of measurement targets in measuring the time taken for the measurement target to travel a preset section, such as 1) time measurement for measuring a run time performed by a runner of a track and field competition, a marathon, or the like, 2) time measurement for measuring a running time of a vehicle such as a bicycle, a motorbike, and an automobile, 3) time measurement for measuring a running time of a boat in a yacht racing or the like, and 4) time measurement for a competition of flying an aircraft through pylons.

While the embodiments of the present invention have thus been described in detail with reference to the drawings, a specific configuration is not limited to these embodiments, and the present invention encompasses changes in design made without departing from the gist of the present invention. In addition, the embodiments described above can be combined with each other by taking advantage of mutual techniques unless specific contradictions or problems arise in the objects, the configurations, and the like.

REFERENCE SIGNS LIST

1 Time measurement system
2 Sensor for starting location
3 Sensor for goal location
5 Data server
6 Electronic device terminal
11 Starting location passage sensor
12 Starting location timer
13 Goal location passage sensor
14 Goal location timer
31 Communication unit (first transmission unit)
34 Memory
35 Control unit
41 Communication unit (second transmission unit)

What is claimed is:

1. A non-transitory computer-readable medium storing a program that causes a computer comprising a processor to function as:

a first receiving unit configured to receive
  first time information from a first sensor that includes a first time acquisition unit that acquires the first time information at first timing and a first transmission unit configured to transmit the first time information;
  second time information from a second sensor that includes a second time acquisition unit configure to acquire the second time information at second timing and a second transmission unit configure to acquire transmit the second time information; and a third transmission unit configured to transmit the first time information and the second time information by network communication.

2. The non-transitory computer-readable medium according to claim 1, further configured to function as:

a calculating unit configured to calculate a difference between the first time information and the second time information.

3. The non-transitory computer-readable medium according to claim 1, wherein the third transmission unit is further configured to transmit information to a data server that includes a second receiving unit configured to receive the information transmitted from the processor and a storage unit configured to store the information.

4. The non-transitory computer-readable medium according to claim 1, further configure to function as:

a communicating unit configured to communicate with the first transmission unit of the first sensor and the second transmission unit of the second sensor by short-range communication.

5. A method of time measurement comprising:

receiving first time information from a first sensor that includes a first time acquisition unit configured to acquire the first time information at first timing and a first transmission unit configured to transmit the first time information;

receiving second time information from a second sensor that includes a second time acquisition unit configured to acquire the second time information at second timing and a second transmission unit configured to transmit the second time information; and transmitting, by a third transmission unit, the first time information and the second time information by network communication.

6. The method of the time measurement according to claim 5, the method further comprising calculating a difference between the first time information and the second time information.

7. The method of the time measurement according to claim 5, further comprising transmitting the first time information and the second time information to a data server by network communication.

8. The method of the time measurement according to claim 7, the method comprising calculating a difference between the first time information and the second time information by the data server.

9. An electronic device terminal comprising:

a first receiving unit configured to receive first time information from a first sensor that includes a first time acquisition unit configured to acquire the first time information at first timing and a first transmission unit configured to transmit the first time information;

a second receiving unit configured to receive second time information from a second sensor that includes a second time acquisition unit configured to acquire the second time information at second timing and a second transmission unit configured to transmit the second time information; and a third transmission unit configured to transmit the first time information and the second time information by network communication.

10. A time measurement system comprising:

a first sensor that includes a first time acquisition unit configured to acquire first time information at first timing and a first transmission unit configured to transmit the first time information;

a second sensor which includes a second time acquisition unit configured to acquire second time information at second timing and a second transmission unit configured to transmit the second time information; and an electronic device terminal includes a first receiving unit configured to receive the first time information transmitted from the first sensor and the second time information transmitted from the second sensor, wherein the electronic device terminal includes a third transmission unit configured to transmit information received by the first receiving unit by network communication.

11. The time measurement system according to claim 10, wherein the electronic device terminal comprises a calculation unit configured to calculate a difference between the received first time information and the received second time information.

12. The time measurement system according to claim 10, further comprising a data server having a second receiving unit configured to receive information transmitted from at least the third transmission unit of the electronic device terminal and a storage unit configured to store information received by the second receiving unit.

13. The time measurement system according to claim 12, wherein the data server comprises a calculation unit configured to calculate a difference between the received first time information and the received second time information.

14. The time measurement system according to claim 12, wherein the electronic device terminal is further configured to be carried by a measurement target person.

* * * * *